United States Patent [19]

Orshansky, Jr., deceased et al.

[11] 4,258,585
[45] Mar. 31, 1981

[54] FOUR-RANGE HYDROMECHANICAL TRANSMISSION WITH HYDROSTATIC STEERING MODULE

[75] Inventors: Elias Orshansky, Jr., deceased, late of San Francisco, Calif., by Betty B. Orshansky, executrix; William E. Weseloh, San Diego, Calif.

[73] Assignee: Orshansky Transmission Corporation, New York, N.Y.

[21] Appl. No.: 902,216

[22] Filed: May 2, 1978

[51] Int. Cl.³ .................... F16H 47/04; F16H 1/44
[52] U.S. Cl. ................................ 74/687; 74/710.5; 74/718
[58] Field of Search ............... 74/687, 720.5, 720, 74/718, 710.5

[56] References Cited

U.S. PATENT DOCUMENTS

| | | | |
|---|---|---|---|
| 3,199,376 | 8/1965 | De Lalio | 74/687 X |
| 3,426,621 | 2/1969 | Mooney, Jr. et al. | 74/720.5 |
| 3,492,891 | 2/1970 | Livezey | 74/687 |
| 3,534,635 | 10/1970 | Polak | 74/720.5 |
| 3,545,303 | 12/1970 | Whelahan | 74/720.5 |
| 3,575,066 | 4/1971 | Livezey et al. | 74/687 |
| 3,583,256 | 6/1971 | Livezey | 74/687 |
| 3,590,658 | 7/1971 | Tuck | 74/687 |
| 3,596,535 | 8/1971 | Polak | 74/687 X |
| 3,815,698 | 6/1974 | Reed | 74/720.5 |
| 3,888,139 | 6/1975 | Orshansky, Jr. | 74/687 |

FOREIGN PATENT DOCUMENTS

1180256 10/1964 Fed. Rep. of Germany .......... 74/720.5

*Primary Examiner*—Leslie Braun
*Attorney, Agent, or Firm*—Owen, Wickersham & Erickson

[57] ABSTRACT

A hydromechanical transmission especially suited to track-laying vehicles. A series of planetary assemblies are provided in conjunction with a hydrostatic driving module and a hydrostatic steering module. Every range may operate in both forward and reverse modes, and the change between forward and reverse can be made in any range. Efficient operation in moving straight ahead or back and on turns is assured.

17 Claims, 16 Drawing Figures

FOUR-RANGE HYDROMECHANICAL TRANSMISSION WITH HYDROSTATIC STEERING MODULE

BACKGROUND OF THE INVENTION

This invention relates to a hydromechanical transmission, primarily for track-laying vehicles. It incorporates a series of planetary assemblies in conjunction with a hydrostatic driving module and also a hydrostatic steering module.

The invention relates to the problem of obtaining efficient operation of a track-laying vehicle. It may be considered to be an improvement of the invention shown in my U.S. Pat. No. 3,888,139, as particularly adapted to track-laying vehicles.

In one preferred form thereof it provides a four-stage transmission which may operate either in forward or in reverse in all four stages or ranges. It enables rapid change from forward to reverse to occur smoothly without the usual clutch changing delays and enables the very efficient operation of the track-laying vehicle both in moving straight forward on in straight reverse or in making turns. In the hydrostatic (starting) mode, the change from forward to reverse is made by changing the direction of slope of the swash plate of a hydraulic unit. In the hydromechanical mode or modes, forward or reverse operation is obtained by engagement of a forward clutch or a reverse clutch. All clutch engagements are synchronous including the initial engagement for startup.

SUMMARY OF THE INVENTION

In the hydromechanical transmission of this invention, an input shaft coming from the engine is at all times connected by gears to both a forward gear and a reverse gear. The forward and reverse gears are on a common centerline and rotate in opposite directions at equal speeds. In a preferred arrangement, the input shaft has an input bevel gear in engagement with both a forward bevel gear and a reverse bevel gear. The forward bevel gear is mounted on a first shaft, preferably hollow, and there is a second shaft coaxial with the first shaft, preferably inside it. Both the forward bevel gear and the reverse bevel gear may be clutched (at different times) to this second shaft. In an alternate arrangement, there may be two spur gears on the input shaft, one driving and in mesh with a forward gear, the other one driving a reverse gear through an idler gear.

A hydrostatic driving module having a variable-stroke hydraulic unit is in driving relation with the first shaft. The module has a fixed-stroke hydraulic unit, hydraulically connected to the variable-stroke hydraulic unit so that when one unit acts as a pump the other unit acts as a motor and vice versa. A third shaft is in driving relation with a fixed-stroke hydraulic unit and carries rigidly the sun gear of at least one of a plurality of planetary assemblies.

A fourth shaft, coaxial with the third shaft and in driving relation with the second shaft, is rigidly connected to the ring gear of the first planetary assembly. In some form of the invention, the third and fourth shafts are clutched together in the hydrostatic range.

In the simplest form of the invention, there is only one hydromechanical range and one hydrostatic (starting) range, both of the ranges having both forward and reverse modes. In more complex forms, there may be two, three, or more hydromechanical ranges. In all forms of the invention there is a plurality of planetary assemblies, from which an output is provided to a take-off shaft coaxial with the planetary assemblies and therefore with the third and fourth shafts. This output preferably provides rigid connection between a carrier of a planetary assembly and this take-off shaft.

In all modes of the invention, the change between forward and reverse in the hydrostatic mode is made without clutches, by changing the direction of tilt of the swash plate for the variable-stroke hydraulic unit. Forward and reverse operation are obtained by clutching the forward gear to the second shaft for forward mode and by clutching the reverse gear to the second shaft for the reverse mode.

In the simplest form of the invention two planetary assemblies are connected together. Both sun gears are mounted on the third shaft, and the hydromechanical input is by the fourth shaft to the ring gear of a first planetary assembly. The carrier of that assembly is connected to the take-off shaft, as is the ring gear of the second planetary assembly. The carrier of the second planetary assembly has a brake to lock it to the main frame for the hydrostatic mode and to release it for the hydromechanical modes.

Three hydromechanical ranges may be attained by using a third planetary assembly. In one embodiment of this invention, the sun gears for the first two planetary assemblies are mounted on the third shaft, and the fourth shaft is secured to the ring gear of the first planetary assembly and also to the carrier of the second planetary assembly. A fifth shaft, coaxial with both the third and fourth shafts, is rigidly connected to the ring gear of the second planetary assembly and to the sun gear of a third planetary assembly. This fifth shaft is clutchable to the carrier of the third planetary assembly. Moreover, the take-off shaft, coaxial with the third, fourth, and fifth shafts, is rigidly connected to the carrier of the third planetary assembly, carries at one end one member of a fourth planetary assembly and at the other end one member of the fifth planetary assembly.

In another embodiment of the invention, only the sun gear of the first planetary assembly is secured to the third shaft, while the fourth shaft again carries the ring gear of the first planetary assembly and the carrier of the second planetary assembly. The fifth shaft, in this instance, carries both the sun gear of the second planetary assembly and the sun gear of the third planetary assembly. Once again, the fifth shaft is clutchable to the carrier of the third planetary assembly, and the carrier is secured to the take-off shaft.

The first and third planetary assemblies are arranged so that their carriers can be clutched together, and in the latter of the two embodiments just described, the ring gear of the second planetary assembly is rigid with the carrier of the first assembly. A brake holds the ring gear of the third planetary assembly stationary to the frame in some range.

For track-carrying vehicles, there may be two output shafts, one for each of the tracks on the two sides of the vehicle. One of these is rigidly connected to the carrier of the fourth planetary assembly and the other to the carrier of the fifth planetary assembly.

Preferably, but not necessarily, a hydrostatic steering module is also provided, having a variable-stroke hydraulic unit and a fixed-stroke hydraulic unit that are hydraulically connected together, so that when one unit serves as a pump the other one serves as a motor and vice versa. The variable-stroke hydraulic unit is connected in driving relation with the variable-stroke hydraulic unit of the driving module. A gear train connects the fixed hydraulic unit of the steering module to the sun gear of the fourth planetary assembly, and another gear train connects the same unit through an idler to the sun gear of the fifth planetary assembly. Each of the two output shafts had a brake capable of holding it stationary relative to the frame.

In a modification of either form of the invention just described, the carrier of the third planetary assembly carries compound planet gears having a larger diameter portion in engagement with the sun gear of the third planetary assembly and a smaller diameter portion in engagement with the ring gear of that same planetary assembly.

In all forms of the invention clutches enable changing from range to range, and the hydrostatic driving module enables variations of speed within any particular range. The steering module, of course, determines whether the two output shafts run at the same speed (in which event the vehicle goes either straight forward or straight backward, depending upon the mode), or it applies more speed to one shaft than the other, and this, of course, results in turning the vehicle.

Other objects and advantages of the invention will appear from a description of some preferred forms, and an understanding of the operation will become clearer after that.

BRIEF DESCRIPTION OF THE DRAWINGS

In the drawings:

FIG. 7A is a clutch-engagement and range diagram for the transmission of FIG. 7.

FIG. 9A is a clutch-engagement and range diagram for the transmission of FIG. 9.

SOME PREFERRED EMBODIMENTS OF THE INVENTION

Figure 1:
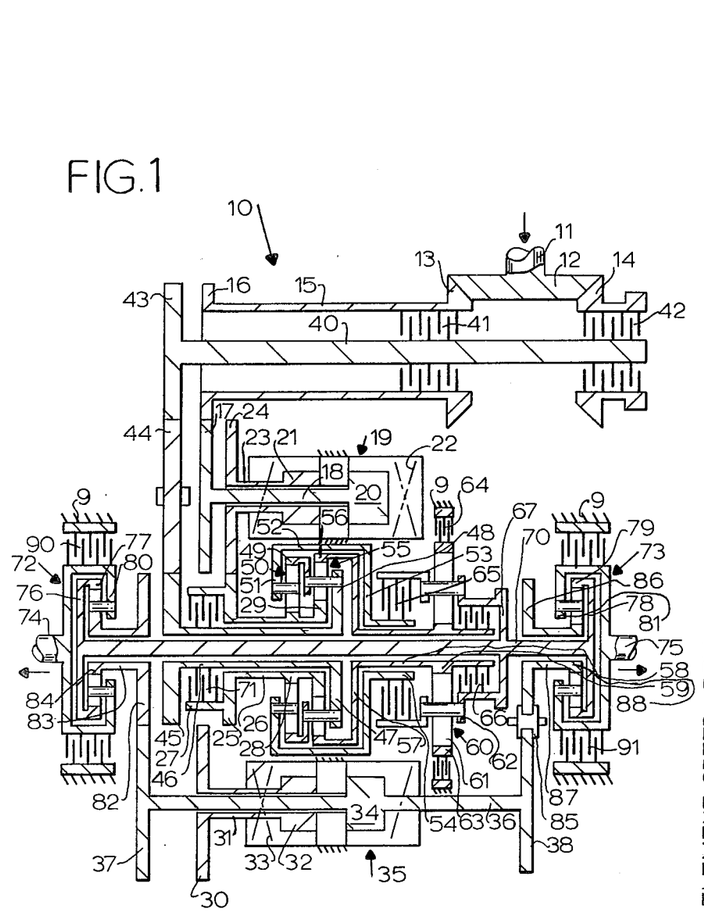
FIG. 1 is a diagrammatic view of a transmission embodying the principles of the invention.
Figure 1A:
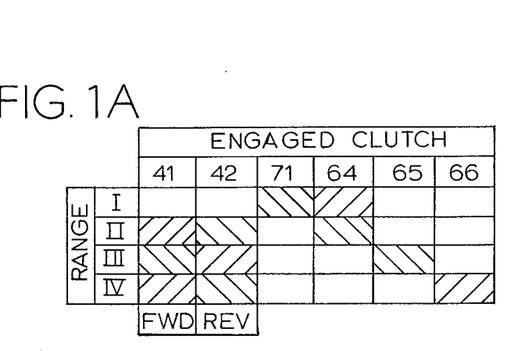
FIG. 1A is a clutch-engagement and range diagram for the transmission of FIG. 1.

The transmission 10 of FIG. 1

The transmission 10 of FIG. 1 is inside a frame 9 and has an input shaft 11 at the end of which is a bevel gear 12. The bevel gear 12 meshes with a bevel gear 13 to impart a forward motion to the remainder of the transmission 10 and with a bevel gear 14 to impart a reverse direction to the transmission 10, depending on the engagement of certain clutches, when the transmission 10 is in its hydromechanical mode. This bevel-gear input is desirable, but the input of FIG. 11 may be used instead.

The forward bevel gear 13 is secured to one end of a shaft 15 and the opposite end of the shaft 15 carries a gear 16. The gear 16 is in engagement with a gear 17 which is mounted on a shaft 18. The shaft 18 rotates a variable-stroke hydraulic unit 20 of a speed-varying module 19. The unit 20 is operated in driving connection with a fixed-stroke hydraulic unit 21 of the module 19. The hydraulic unit 20 has a variable swash or wobble plate 22 for changing the stroke of the unit 20. The units 20 and 21 are connected together hydraulically so that when one operates as a pump the other operates as a motor, and vice versa. The hydraulic unit 21 is mounted on a hollow shaft 23 at the end of which is a gear 24. The gear 24 engages a gear 25 which is mounted on a hollow shaft 26 that carries a clutch flange 27 and two sun gears 28 and 29. We shall return to the planetary assemblies of these sun gears 28 and 29 shortly.

The gear 17, which is mounted on the shaft 18 for the variable hydraulic unit 20 and is in engagement with the forward-moving gear 16, is also in mesh with a gear 30 mounted on a hollow shaft 31 of another variable-stroke hydraulic unit 32 having a variable swash or wobble plate 33. The unit 32 is hydraulically connected with a fixed-stroke hydraulic unit 34 and with it constitutes a hydrostatic steering module 35. The fixed hydraulic unit 34 and the variable-stroke hydraulic unit 32 are arranged so that when one operates as a pump the other operates as a motor, and vice versa. The fixed-stroke hydraulic unit 34 is mounted on a shaft 36 having gears 37 and 38 at its opposite ends.

A shaft 40 located near the input is coaxial with both the forward shaft 15 and the reverse bevel gear 14. A clutch 41, when engaged, connects the forward shaft 15 to the shaft 40 and a reverse clutch 42, when engaged, connects the reverse bevel gear 14 to the shaft 40. These will be used in the hydromechanical ranges to determine the direction of application of power. The shaft 40 has at one end a gear 43 which is in engagement with an idler gear 44 that is in mesh with a gear 45.

The gear 45 is mounted on a hollow shaft 46 having a flange 47 at the opposite end and on which is mounted a planetary carrier 48. The carrier 48 is also rigidly mounted to a ring gear 49.

The ring gear 49 and the sun gear 28 are both parts of a first planetary assembly 50 having a carrier 51. This carrier 51 is connected to a drum 52 and a flange 53 to a hollow shaft 54.

The carrier 48 and the sun gear 29 are both parts of a second planetary assembly 55 having a ring gear 56 which is connected, as by a flange 57, to a hollow shaft 58 carrying a sun gear 59.

The sun gear 59 is part of a third planetary assembly 60 having planet gears 61 mounted on a carrier 62 and in engagement with a ring gear 63. The ring gear 63 may be held stationary by a brake 64 that is secured to the frame 9. The carrier 62 may be clutched by a clutch 65 to the hollow shaft 54 which is rigidly connected to the carrier 51 of the first planetary assembly 50. The carrier 62 also may be clutched by a clutch 66 to the hollow shaft 58 carrying the sun gear 59 and rigidly connected to the ring gear 56 of the second planetary assembly 55. Furthermore, the carrier 62 is connected by a flange 67 to a shaft 70.

A clutch 71 enables the engagement of the clutch flange 27 (which is connected to the sun gears 28 and 29 of the two planetary assemblies 50 and 55) to the hollow shaft 46 (which is connected to the carrier 48 of the planetary assembly 55 and the ring gear 49 of the planetary assembly 50).

The shaft 70 is connected at each end to a planetary assembly 72 or 73, leading respectively to outputs shafts 74 and 75. The shaft 70 is joined by a flange 76 to a ring gear 77 of the fourth planetary assembly 72, and the shaft 70 is also joined by a flange 78 to a ring gear 79 of the fifth planetary assembly 73. The output shaft 74 is joined to a carrier 80 of the fourth planetary assembly 72, while the output shaft 75 is joined to a carrier 81 of the fifth planetary assembly 73. Moreover, the gear 37 meshes with a gear 82 mounted on a hollow shaft 83 carrying a sun gear 84 for the fourth planetary assembly 72. Similarly, the gear 38 is connected through an idler 85 to a gear 86 mounted on a hollow shaft 87 carrying a sun gear 88 for the fifth planetary assembly 73. The idler gear 85 may be in mesh with the gear 82 instead of with the gear 86, if desired. The carrier 80 may be held stationary by a brake 90 which is secured to the frame 9, while the carrier 81 may be held stationary by a brake 91, also secured to the frame 9.

A feature of this invention is that speeds can be obtained in either forward or reverse for *all* ranges of the transmission. In the hydrostatic mode, the difference between forward and reverse is determined by positive or negative tilt of the wobble plate 22; in the hydromechanical mode the difference is made by throwing the clutches 41 and 42. A track-laying vehicle (or other machine) may operate in forward or reverse at any speed and in any range.

In Range I, neither clutch 41 or 42 is engaged, and the input drive from the forward bevel gear 13 is transmitted by the shaft 15 and its gear 16 to the gear 17 mounted on the shaft 18 which drives the variable-stroke hydraulic unit 20. The hydraulic unit 20 drives the fixed-stroke hydraulic unit 21 and therefore sends power through the gear 24 to the gear 25. The clutch 71 is engaged, locking up the second planetary assembly 55. Power is then transmitted through the locked-up planetary assembly 55 and via the ring gear 56, the flange 57 and the hollow shaft 58 to the sun gear 59, since the brake 64 is engaged, power is further transmitted to the carrier 62.

Figure 2:
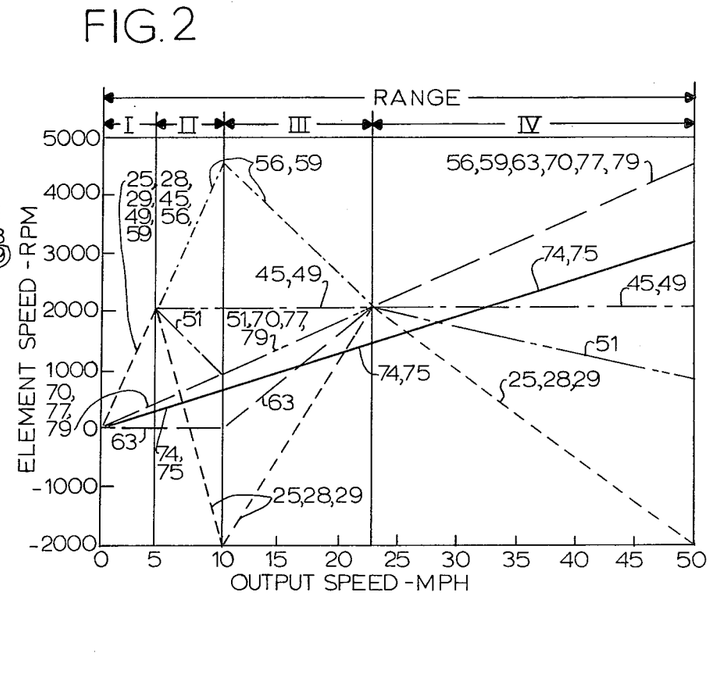
FIG. 2 is a speed diagram in which the speed of the elements in r.p.m. is plotted against the output speed in miles per hour for the transmission of FIG. 1.

As shown in FIG. 2, in this Range I the speeds of the gear 45, the ring gear 49, and the carrier 48 are identical and are the same as the speeds of the gear 25, the two sun gears 28 and 29, and the sun gear 59.

In this hydrostatic stage, therefore, the shaft 70 is driven by the carrier 62, and the speed of the carrier 62 is increased according to the position of the wobble plate 22 of the hydrostatic driving module 19. The direction of the tilt of the wobble plate determines whether the vehicle is in forward or reverse. The speed of the shaft 70 is transmitted to both output shafts 74 and 75 through their respective fourth and fifth planetary assemblies 72 and 73. Also as the speed of the gear 45 increases, so do the speeds of the gear 44, the gear 43, and the shaft 40, until the speed of the shaft 40 equals the speeds of the bevel gear 13 and the shaft 15.

Figure 3:
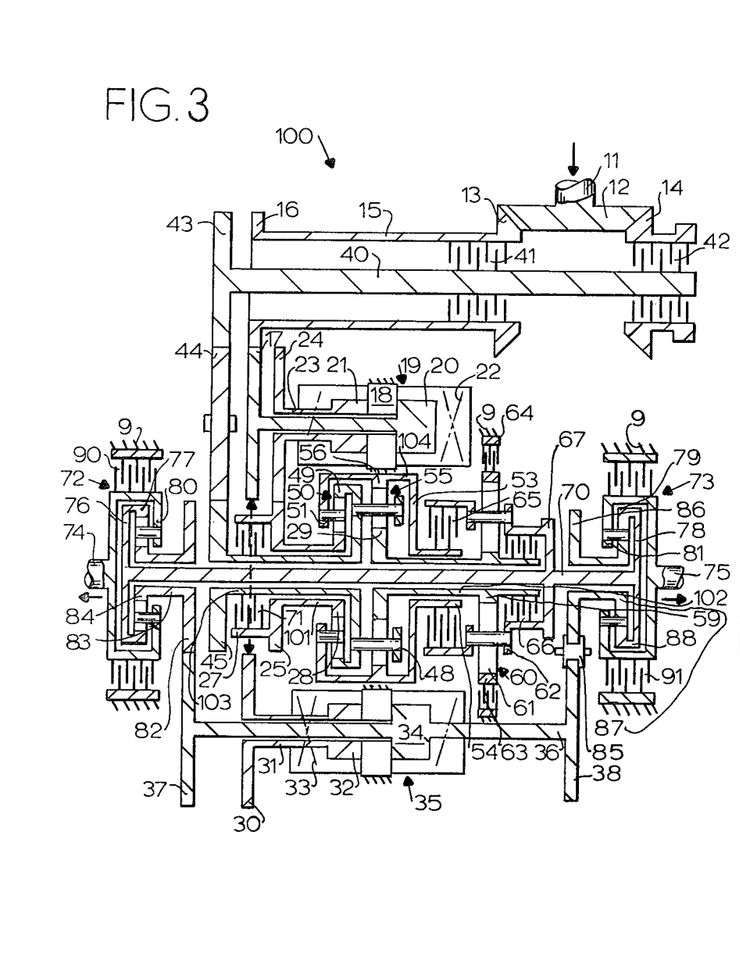
FIG. 3 is a view similar to FIG. 1 of a modified form of transmission also embodying the principles of the invention.

When the element speed slightly exceeds 2000 r.p.m., the shift is made from Range I to Range II. Since what applies for the forward mode applies for the reverse mode in most particulars except for whether the clutch 41 or the clutch 42 is being used and for what happens. Accordingly, the hydromechanical ranges will first be described in its forward mode with the clutch 41 engaged and the clutch 42 disengaged. In Range II the brake 64 is still engaged, but the clutch 71 is disengaged, and the clutch 41 is engaged. Therefore, the sun gears 28 and 29 and the gear 10 no longer are confined to rotate at the same speed as the hollow shaft 46 and the elements mounted thereon. The hollow shaft 46 and the members attached thereon rotate at constant speed (relative to the engine), since the clutch 41 is engaged. The speed of the shaft 26 and of the sun gears 28 and 29 drops to zero and, still within this Range II, goes negative up to an amount, at the end of Range II, substantially equal to the positive speed that these elements had at the time of shift into Range II. However, the speeds of the ring gear 56 and of the sun gear 59 continues to increase on a straight line basis, as they were doing before, until they reach the end of Range II. In the meantime, the speed of the carrier 51 of the planetary assembly 50 has declined to a value of about half what it had at the beginning of Range II. The output speed continues to increase, as shown in FIG. 3.

All this time the ring gear 63 has been held stationary by the brake 64. When the speed of the carrier 51 is the same as the speed of the shaft 70, the shift is made into Range III by engaging the clutch 65 and simultaneously or soon thereafter releasing the brake 64. The carrier 62 and the shaft 70 are therefore now clutched to the carrier 51 of the first planetary assembly 50.

In Range III, the sun gears 28 and 29 and their shaft 26 decrease in their (negative) speed, cross the zero speed point, and then increase back up to their maximum speed, where they reach the end of Range III. Also, during Range III the speed of the sun gear 59 decreases to reach the same speed at the end of Range III, while the speeds of the gears 45 and 49, the carrier 48, and the shaft 46, remain constant, as they do for the rest of the operation. At the end of Range III all the planetary elements in the planetary assemblies 50, 55, and 60, are at the same speed and consequently another shift can be made. This time the clutch 66 is engaged, and then the clutch 65 is released. The clutch 66 clutches the shaft 70 and the carrier 62 of the planetary assembly 60 to the shaft 58 which carries the sun gear 59 and also the ring gear 56 of the planetary assembly 55. From this point on the speed of the ring gear 63, the sun gear 59, is identical to the speed of the shaft 70 and therefore to the speed of the ring gears 77 and 79 of the planetary assemblies 72 and 73, this speed continues to rise and, as a result, the output speed of the shafts 74 and 75 also rises, as governed by the ratios of their planetary assemblies 72 and 73. In Range IV the speed of the sun gears 28 and 29 and of their shaft 26 continues to decline going through the zero point and into the negative speeds again, while the speed of the carrier 51 drops steadily but at a smaller slope.

Operation of the transmission in reverse in Ranges II, III, and IV is exactly the same except that the clutch 41 is disengaged, the clutch 42 is engaged. In Range I the position of the variable wobble plate 22 of the hydraulic module 19 is opposite in direction, resulting in a reversal in the direction of the gears and shafts involved.

A unique feature of this device is that it is a multiple-range hydromechanical transmission in both forward and reverse, and exactly the same power flow path (same clutch engaged) is used in both Range I forward and Range I reverse. Furthermore, Range I is hydrostatic in both forward and reverse, reverse being accomplished by stroking the variable unit wobble plate 22 to the opposite side of center to that required in forward. In going from forward into reverse, the hydrostatic range clutch 71 may remain engaged, thus, enabling rapid and smooth direction changing. At the end of the hydrostatic starting range in either forward or reverse, a synchronous shift may be made into the first hydromechanical range by engaging the appropriate (forward or reverse) clutch 41 or 42, while releasing the clutch 71.

Steering is done by affecting the direction and slope of the wobble plate 33 of the hydrostatic steering module 35. When it is untilted, the vehicle moves in a straight line, whether forward or backward. When the wobble plate 33 is tilted in either direction, the gears 37 and 38 rotate to drive their related gears 82 and 86 in opposite directions, thereby changing the speeds of the two output shafts 74 and 75 relative to each other. One of the brakes 90 or 91 may be engaged to assist in turning. The transmission is useful without the steering feature, but its utility is increased in track-laying vehicles and the like when steering is also incorporated.

Thus, the hydrostatic steering module can be separated from the remainder of the transmission, in which case the two output planetary assemblies—the fourth and fifth planetary assemblies—in conjunction with the gear train connecting the two sun gears together, become a differential enabling the vehicle to be steered in a conventional manner using the brakes 90 and 91 as steering brakes. For a non-track-laying or "half-track" vehicle, a steering axle may be used instead.

The modified transmission 100 of FIG. 3

Generally speaking the transmission 100 of FIG. 3 is exactly like that of FIG. 1 except for a very few but quite important differences. Therefore, the same numbers are used wherever the parts are identical and different numbers are used when the parts are different.

In this form of the invention the gear 25 is mounted on a shaft 101 carrying the sun gear 28 but not the sun gear 29. Instead, the sun gear 29 is mounted on a shaft 102, which also carries the sun gear 59. Similarly, the gear 45 is mounted on a shaft 103 which is identical functionally to the shaft 46 but is drawn differently; the shaft 46 carries the carrier 48 and the ring gear 49, as before. The carrier 51 is mounted to a drum 104 which, in this instance, also carries the ring gear 56 as well as the hollow shaft 54 to which it is connected by the flange 53.

Figures 3A, 4:
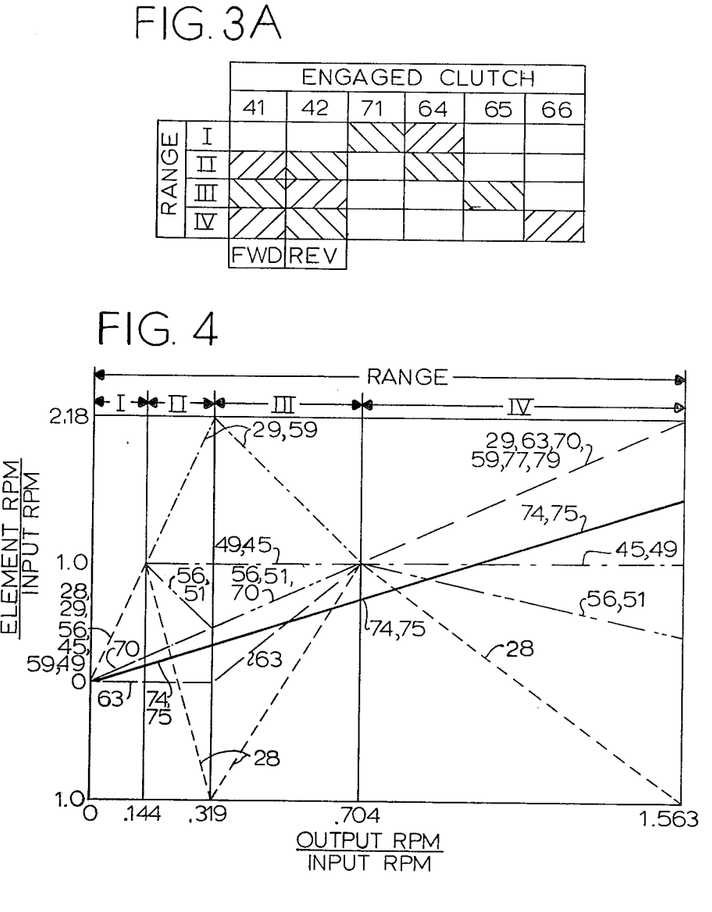
FIG. 3A is a clutch-engagement and range diagram for the transmission of FIG. 3.
FIG. 4 is a graph in which the ratio of the element speed to the input speed, both in r.p.m., is plotted against the ratio of the output speed to the input speed, both in r.p.m., for various elements of the transmission.

The same clutches are used in operating, but the effect is somewhat different, as can be seen from FIG. 4.

In Range I, the clutch 71 is engaged, locking the first planetary assembly 50 and the second planetary assembly 55. The brake 64 is engaged. Thus, in Range I the hydrostatic drive through the gear 25 operates on the sun gear 28, on the ring gear 49, on the carrier 48, and, via the planets of the assembly 55, on the sun gear 29 and on the ring gear 56. Power is then transmitted from the sun gear 29, via the hollow shaft 102 to the sun gear 59. As shown in FIG. 4 in this Range I, the speeds of the gear 45, the ring gear 49, and the carrier 48 are identical and are the same as the speeds of the gear 25, the two sun gears 28 and 29, and the sun gear 59. As the speed of the gear 45 increases, so does the speed of the gear 44, the gear 43, and the shaft 40 until the speed of the shaft 40 equals the speeds of the bevel gear 13 and the shaft 15.

As the shift is made into Range II, the clutch 41 is engaged (for forward movement) and the clutch 71 is disengaged. The speed of the sun gear 29 continues to rise, but the speed of the sun gear 28 drops in Range II, going through the zero point in the middle of the range and becoming negative and reaching (at the end of Range II) a magnitude equal but opposite to that it had at the beginning of Range II.

The switch is made from Range II to III when the speed of the ring gear 56 and of the carrier 51 become equal to the speed of the shaft 70. The clutch 65 is engaged, and the brake 64 disengaged. At that time, the speed of the sun gear 29 is at a maximum, and in Range III it declines, reaching the speed of the gear 45 at the end of Range III. Similarly, the speed of the sun gear 28 drops down to the zero point and then moves in the positive direction up to the speed of the gear 45. At the end of Range III all the members of the planetary assemblies 50, 55, and 60 are at the same speed, and the shift is made into Range IV by engagement of the clutch 66 and disengagement of the clutch 65, with results similar to those that have been discussed before.

The configuration of FIG. 3 has an advantage over the configuration of FIG. 1 when the width of the second and fourth ranges are increased. In FIG. 1 as the second and fourth ranges are increased, the diameter ratio of the ring gear 56 to the sun gear 29 decreases, thus making gear and bearing design difficult or impossible. Conversely, in the configuration of FIG. 3, the ring-56-to-sun-29 diameter ratio increases with increasing width of Range II and Range III, resulting in very conventional gear and bearing proportions.

Figure 5:
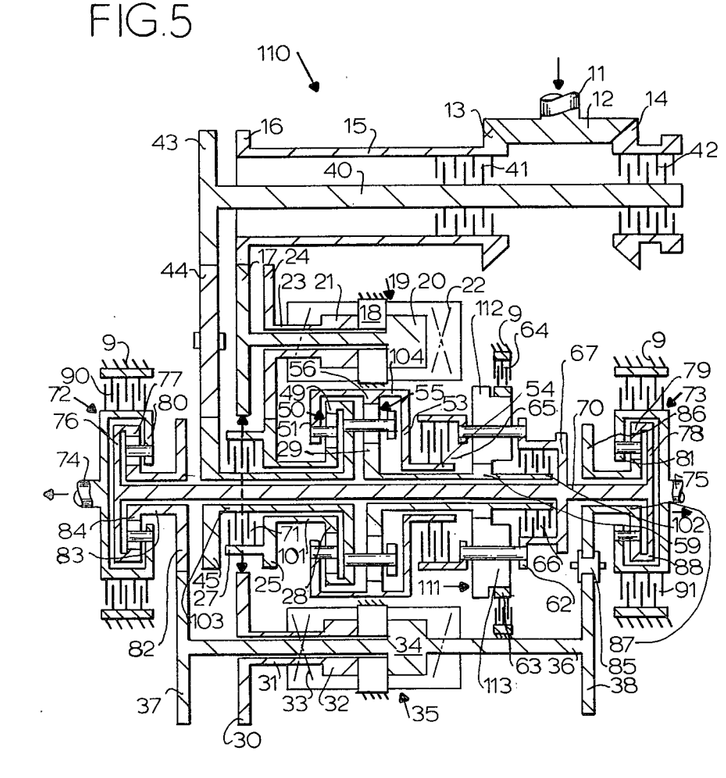
FIG. 5 is another view similar to FIG. 1 of another modified form of transmission also embodying the principles of the invention.
Figure 5A:
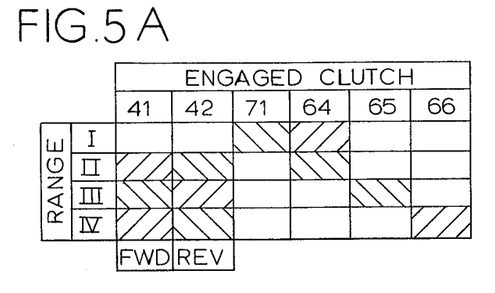
FIG. 5A is a clutch-engagement and range diagram for the transmission of FIG. 5.

The transmission 110 of FIG. 5

Figure 6:
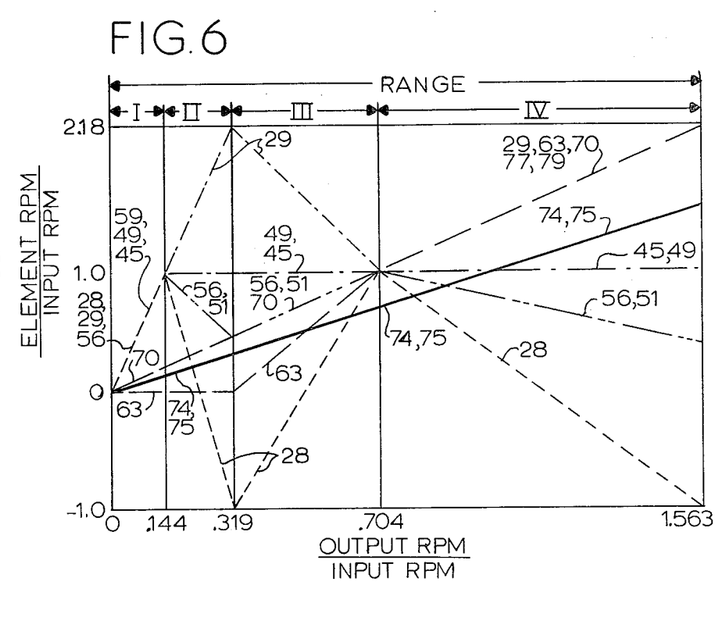
FIG. 6 is a diagram like that of FIG. 4 for the transmission of FIG. 5.

The transmission 110 of FIG. 5 closely resembles that of FIG. 3. The only difference here is that the planetary assembly 60 is replaced by a planetary assembly 111, which has the important difference that its planet gears are complex, having a portion 112 engaging the sun gear 59 and a portion 113 of smaller diameter, but rigidly connected to the portion 112, which engages the ring gear 63. The operation is the same, as can be seen by comparing FIGS. 4 and 6. The planetary assembly 111 of FIG. 5 serves exactly the same function as the planetary assembly 60 of FIG. 1 and the planetary assembly 60 of FIG. 3, the difference being that the planetary assembly 111 of FIG. 5 has a proportionally larger sun gear 59, relative to the ring gear 63, which is particularly important as reduction ratio of this planetary assembly is increased and in view of the requirement to transmit power through the shaft 70 which passes through the sun gear 59.

Figure 7:
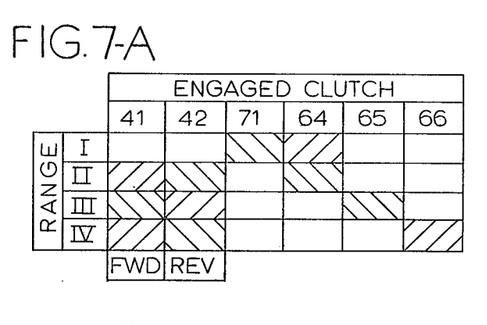
FIG. 7 is another view similar to FIG. 1 of yet another modified form of transmission, also embodying the principles of the invention.
Figure 8:
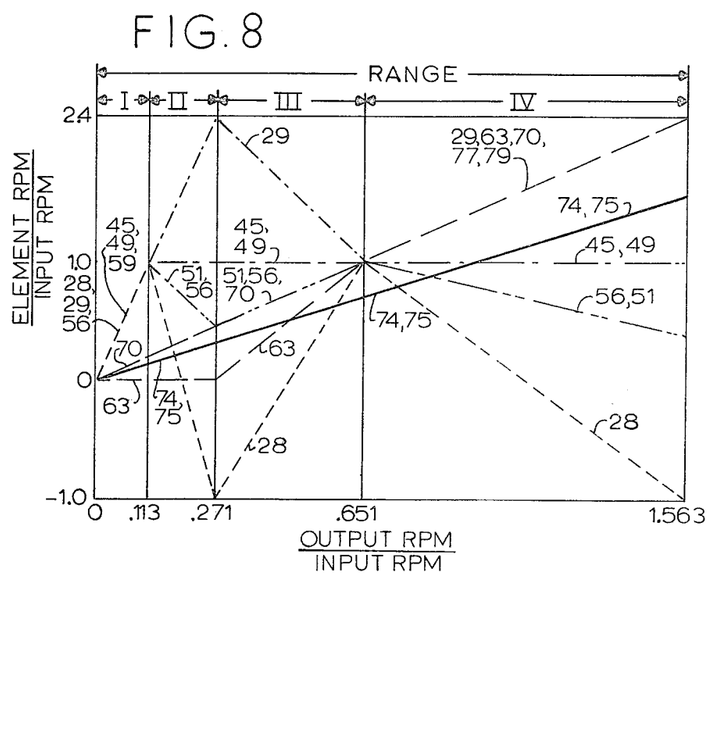
FIG. 8 is a diagram like that of FIG. 6 with a transmission of FIG. 7.

The transmission 200 of FIG. 7

The transmission 200 of FIG. 7 is very much like that of FIG. 5. It differs from the other configurations previously shown, however, in that the variable-unit drive gears are on the opposite side of the transmission from the fixed-unit drive gears. This has the advantage that it does not require a hollow shaft or through shaft construction within the main hydraulic module, and thus it enables a more conservative and conventional type of hydraulic module construction. In these particulars, it is applicable to transmissions of FIGS. 1 and 3.

The transmission 200 includes an input shaft 211 to which is secured a bevel gear 212. The bevel gear 212 is in engagement at all times with both a bevel gear 213 for forward movement of the transmission 200 and a bevel gear 214 for reverse movement of the transmission 200. The forward gear 213 is affixed to a shaft 215 which is also secured to or made integral with a gear 216. The gear 216 drives a gear 217 on a shaft 218, which operates the hydraulic drive module 220. Without any hollow shafts, the shaft 218 goes directly to a variable-stroke hydraulic unit 221 with its movable swash plate 222. The unit 221 in turn is connected by a hydraulic conduit device to a fixed-stroke hydraulic unit 223 with a fixed swash plate 224. Another conventional type of shaft 225 leads to a gear 226. The gear 226 is in engagement with the gear 25, and the transmission elements which are connected with the gear 25 are exactly as are shown in FIG. 5, and the same reference numbers are applied. Operation is also the same except that the simpler form of hydraulic drive module 220 is used.

There is another difference also in the assembly as regards its hydraulic steering module 230. A gear 231 in mesh with the gear 217 is mounted on a hollow shaft 232 which leads to a variable-stroke hydraulic unit 233. The unit 233 is connected hydraulically to a fixed-stroke hydraulic unit 234, which is mounted on a shaft 235. The shaft 235 is engageable by an axis steering clutch 236 to a member 237 carrying a gear 238 which is meshed with the gear 25. The shaft 235 also carries a gear 239, which is in mesh with the gear 82. This means that when (and only when) the transmission 200 is in neutral mode, axis steering may be assisted by the module 220.

The fixed unit 234 is also mounted on a shaft 240 which extends through the hollow shaft 232 and carries a gear 241. The gear 241 is in engagement with the idler 85 and therethrough to the gear 86. It will be noted that in both the device of FIG. 5 and the device of FIG. 7 there is a necessity for a hollow shaft in the hydrostatic steering module 230, but that no such shaft is needed in the main hydrostatic drive module 220.

The operation is substantially the same as before except that the presence of the clutch 236 enables axis steering when the transmission 200 is in neutral mode.

Comparing FIGS. 1, 3, 5, and 7, it will be noted that:

(1) A basic concept is the use of the hydraulic module 19 to achieve hydrostatic reverse by moving the variable swash plate 22 to the opposite side of center from where it would be for forward operation.

(2) The identical power flow path is used on both hydrostatic forward and reverse, since the same clutch or clutches are engaged.

(3) At the shift point from the hydrostatic mode to the hydromechanical range the wobble plate 22 is off center by the same amount—but in opposite direction for forward and reverse modes.

(4) The identical power flow path is used in both hydromechanical forward and hydromechanical reverse, except as to whether the clutch 41 is engaged or the clutch 42.

(5) In the hydromechanical ranges, the input to the series of interconnected planetary gear assemblies 50, 55, and 60 is always from the shaft 40 via the gears 43, 44, and 45 and the shaft 46 (or 103); in some instances the input operates via the carrier 48, and in other instances it operates via the ring gear 49, these two members always being connected together and serving as input means for the whole series of planetary assemblies 50, 55, and 56.

(6) In Ranges I, II, and IV the ring gear 56 (FIG. 1) or the sun gear 29 (FIG. 3) is an output member and in Range III the carrier 51 is an output member for all species; the output member 56 (in FIG. 1) or 29 (in FIG. 3) is rigidly connected to the sun gear 59 of the third assembly 60, while the output member 51 is clutchable to the carrier 62 by the clutch 65, the sun gear 59 is directly clutchable to the carrier 62 by the clutch 66, and the carrier 62 is mounted on the shaft 70.

(7) The brake 64 is used in Ranges I and II when neither clutch 65 nor 66 is used, output being via the members 62 and 56 or 62 and 29.

(8) The output is always through the take-off shaft 70 and via the two planetary assemblies 72 and 73 to the first output shafts 74 and 75.

(9) In the hydrostatic mode, Range I, the series of planetary assemblies 50, 55, and 60 are locked; in effect the drive is from the module 196 to the shaft 70. In the hydromechanical modes Ranges II, III, and IV, the series of planetary assemblies 50, 55, and 60 is unlocked.

Figures 9, 10, 11:
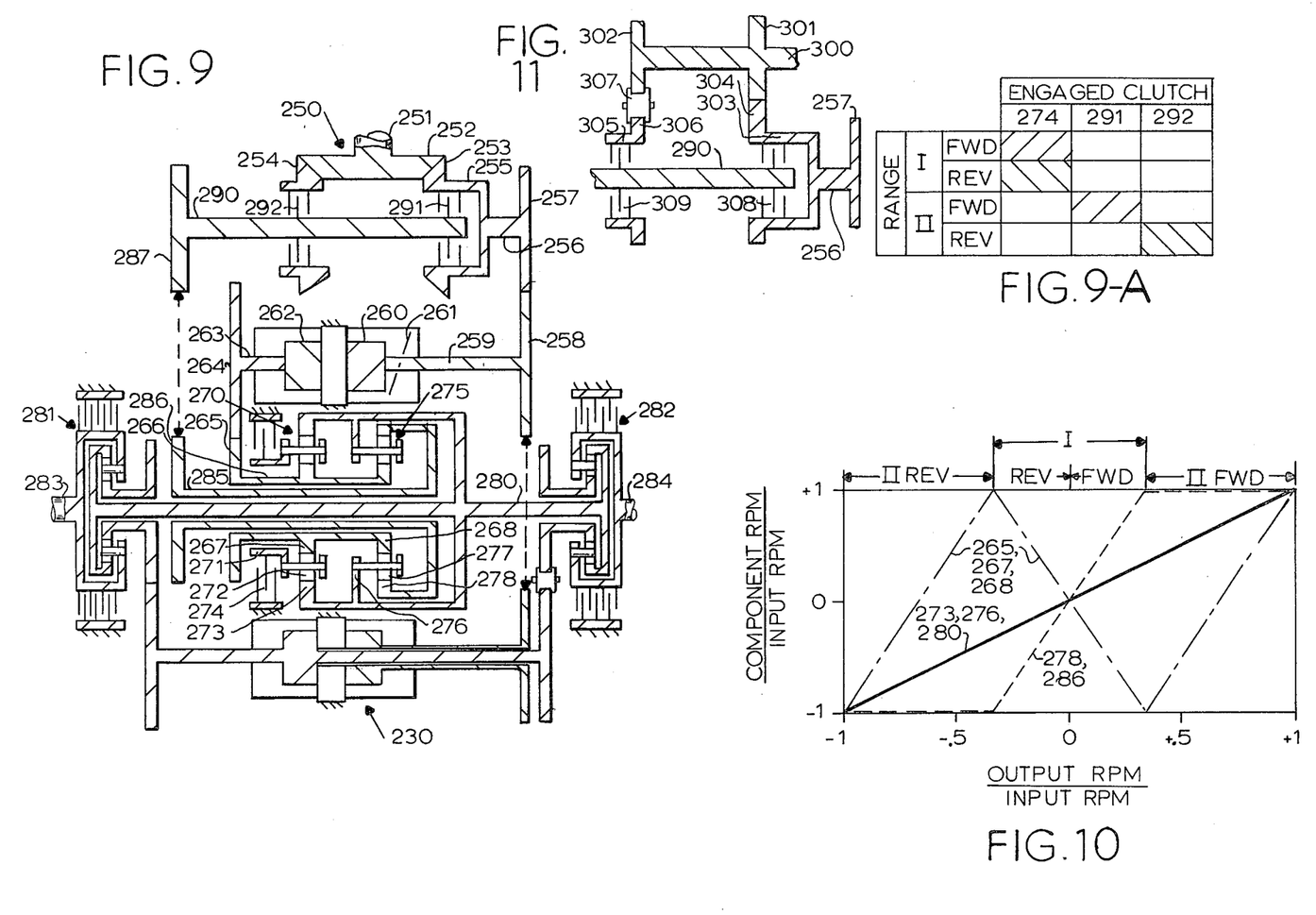
FIG. 9 is another view similar to FIG. 1 of a much simplified and modified form of transmission also embodying the principles of the invention.
FIG. 10 is a speed lines diagram in which the speed of the elements is plotted against the ratio of the output speed to the input speed.
FIG. 11 is a fragmentary view of an alternative form of input system, suitable for use in any of the transmissions of FIGS. 1, 3, 5, 7, and 9.

A transmission 250 having a single hydromechanical range in addition to its hydrostatic range (FIG. 9)

Some features of the invention may be understood better from a very simplified form of the invention shown in FIG. 9. This transmission 250 has only a single hydromechanical range having both forward and reverse modes, in addition to its hydrostatic range, with forward and reverse modes.

An input shaft 251 rotates a bevel gear 252 which is in engagement with a forward bevel gear 253 and a reverse bevel gear 254. The forward bevel gear 253 is mounted on a hollow shaft 255 which is secured, as by a shaft 256, to a gear 257. The gear 257 is in mesh with a gear 258 mounted on a shaft 259, which is in driving relation with a variable-speed hydraulic unit 260 having a movable swash plate 261. The unit 260 is hydraulically connected (as before) to a fixed-stroke hydraulic unit 262. The unit 262 is connected by a shaft 263 carrying a gear 264, which is in engagement with a gear 265 mounted on a shaft 266. The shaft 266 carries a sun gear 267 for a first planetary assembly 270 and a sun gear 268 for a second planetary assembly 275. The first planetary assembly 270 also includes a carrier 271 with planet gears 272 and a ring gear 273. A brake 274 secured to the main frame makes it possible to arrest the movement of the carrier 271.

In the second planetary assembly 275 is a carrier 276 having planets 277. The carrier 276 is rigidly joined to the ring gear 273 of the first planetary assembly 270, and they are rigidly mounted on a take-off shaft 280. This take-off shaft 280 may be the output shaft for the transmission portion, or it may be connected by planetary assemblies 281 and 282 to output shafts 283 and 284 for respective sides of a tracked vehicle.

The planetary assembly 275 also has a ring gear 278 mounted on a shaft 285 that carries a gear 286. This gear 286 may be directly in mesh with a gear 287 on a shaft 290. If desired, an idler may be used in between the gears 286 and 287, but it is not required in this embodiment. The shaft 290 is concentric with the hollow shaft 255 and is provided with a clutch 291 for clutching it to the forward bevel gear 253 and also a clutch 292 for engagement with the bevel gear 254.

In the hydrostatic range, neither clutch 291 or 292 is engaged. In that hydrostatic mode, forward and reverse are achieved by the operation of the swash plate 261 of the variable-speed hydraulic unit 260. The variable swash plate 261 is moved to the opposite side of center between forward operation and reverse operation in this hydrostatic mode. The identical power-flow path is used in both hydrostatic forward and reverse, with the brake 274, then being engaged, and the clutches 291 and 292 not being engaged, the only changes in both speed and direction being those made by the position of the variable swash plate 261. This, of course, is true in all other forms of the invention. At the shift point between the hydrostatic mode and the hydromechanical mode, the variable unit swash plate 261 is in an equal but opposite position off center in its reverse mode from its corresponding forward shift point.

Here, again, the transmission 250 passes directly from forward to reverse in the hydromechanical range, and in the hydrostatic range is accomplished without any clutch change and therefore without any power interruption. As a result a minimum number of clutches is used. As before, there may be the same type of employment of a steering mechanism, and this is shown with numbers corresponding to those in FIG. 7. However, the steering mechanism may be omitted for vehicles of a different kind, and then the take-off shaft 280 becomes the true output shaft, without the need for planetary gears unless gear reduction or something of that nature is desired.

A modified input (FIG. 11)

The bevel-gear input may be replaced in all forms of the invention by a system like that shown in FIG. 11, though the bevel-gear system is generally preferred.

In FIG. 11, an input shaft 300 rigidly carries a pair of spur gears 301 and 302. A hollow shaft 303 carries a forward spur gear 304 in mesh with the gear 301 and is attached (as in FIG. 11 to a shaft portion 256 and a gear 257). A hollow shaft 305 carries a reverse spur gear 306, which is connected to the gear 302 through an idler gear 307. A clutch 308 enables clutching the shaft 303 to the shaft 290, while a clutch 309 enables clutching the shaft 305 to the shaft 290. Thus operation is basically like that of FIG. 9, which applies in toto from then on. Any desired gear ratios may be used for this input system.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A hydromechanical transmission, with a hydrostatic starting range, for track-laying vehicles and the like, including in combination:

a main frame, first, second, third, fourth, and fifth planetary assemblies, each having one sun gear, one ring gear, and one planet carrier with planet gears, an input shaft having an input bevel gear in engagement with both a forward bevel gear and a reverse bevel gear, said forward bevel gear being mounted on a first hollow shaft having another gear thereon, a first driven shaft coaxial with said first hollow shaft, having a drive gear thereon, a first clutch for clutching said driven shaft to said forward bevel gear, a second clutch for clutching said driven shaft to said reverse bevel gear, a hydrostatic driving module having a variable-stroke hydraulic unit on a shaft having a gear in mesh with the other gear of said first hollow shaft, said module also having a fixed-stroke hydraulic unit hydraulically connected to said variable-stroke hydraulic unit, so that when one unit acts as a pump, the other unit acts as a motor, and vice versa, a second hollow shaft in driving relation with said fixed-stroke hydraulic unit and carrying rigidly the sun gear of said first planetary assembly, a third hollow shaft coaxial with said second hollow shaft and in driving relation, through an idler gear with the gear on said first driven shaft, said third hollow shaft being rigidly connected to the ring gear of said first planetary assembly and the carrier of said second planetary assembly, a third clutch for releasably clutching together said second and third hollow shafts, a fourth hollow shaft coaxial with said second and third hollow shafts and rigidly connected to the sun gears of both said second and third planetary assemblies, a second driven shaft coaxial with said second, third, and fourth hollow shafts and rigidly connected to the carrier of said third planetary assembly and carrying at one end the ring gear of said fourth planetary assembly and at the other end the ring gear of said fifth planetary assembly, a fourth clutch for releasably clutching together the carriers of said first and third planetary assemblies, the carrier of said first planetary assembly being rigidly connected to the ring gear of said second planetary assembly, a fifth clutch for releasably clutching together said sun and said carrier of said third planetary assembly, a first brake for holding the ring gear of said third planetary assembly stationary relative to said frame, a first output shaft rigidly connected to the carrier of said fourth planetary assembly, a second output shaft rigidly connected to the carrier of said fifth planetary assembly, a hydrostatic steering module having a variable-stroke hydraulic unit and a fixed-stroke hydraulic unit hydraulically connected together so that when one unit serves as a pump the other one serves as a motor and vice versa, its variable-stroke hydraulic unit being connected to a gear in mesh with the gear on the shaft of the variable-stroke hydraulic unit of said driving module, a first gear train connecting the fixed hydraulic unit of said steering module to the sun gear of said fourth planetary assembly, a second gear train connecting the fixed hydraulic unit, through an idler, to the sun gear of said fifth planetary assembly, a second brake for holding the first output shaft stationary relative to said frame, and a third brake for holding the second output shaft stationary relative to said frame.

2. The hydromechanical transmission of claim 1 wherein the carrier of said third planetary assembly carries planet gears having a larger diameter portion in engagement with the sun gear of the third planetary assembly and a smaller diameter portion in engagement with the ring gear of the third planetary assembly.

3. The hydromechanical transmission of claim 1 wherein said fixed-stroke hydraulic unit of said driving module is on a shaft carrying a gear which is meshed with a gear on said second hollow shaft.

4. The hydromechanical transmission of claim 1 wherein the variable-stroke hydraulic unit of said steering module is on a shaft carrying the gear slated to be in mesh with the gear on the shaft of the variable-stroke hydraulic unit of said driving module.

5. The hydromechanical transmission of claim 1 wherein the fixed-stroke hydraulic unit of said steering unit is mounted on a shaft having a gear at each end, said first gear train comprising one such end-located gear and a gear meshed therewith and on a hollow shaft carrying the sun gear of the fourth planetary assembly, said second gear train comprising: the other said end-located gear, an idler gear in mesh therewith, and a gear on another hollow shaft carrying the sun gear of said fifth planetary assembly and in mesh with said idler gear.

6. A hydromechanical transmission, with a hydrostatic starting range, for track-laying vehicles and the like, including in combination:

a main frame, first, second, third, fourth, and fifth planetary assemblies, each having at least one sun gear, one ring gear, and one planet carrier with planet gears, an input shaft having an input gear means operatively connected to both a forward gear and a reverse gear, said forward gear being mounted on a first shaft, a second shaft coaxial with said first shaft, a first clutch for clutching said second shaft to said forward gear, a second clutch for clutching said second shaft to said reverse gear, a hydrostatic driving module having a variable-stroke hydraulic unit in driving relation with said first shaft, said module also having a second hydraulic unit hydraulically connected to said variable-stroke hydraulic unit, so that when one unit acts as a pump, the other unit acts as a motor, and vice versa, a third shaft in driving relation with said second hydraulic unit and carrying rigidly the sun gear of said first planetary assembly, a fourth shaft coaxial with said third shaft and in driving relation with said second shaft, said fourth shaft being rigidly connected to the ring gear of said first planetary assembly and the carrier of said second planetary assembly, a third clutch for releasably clutching together said third and fourth shafts, a fifth shaft coaxial with said third and fourth shafts and rigidly connected to one gear of said second planetary assembly and to the sun gear of said third planetary assembly, a sixth take-off shaft coaxial with said third, fourth, and fifth shafts and rigidly connected to the carrier of said third planetary assembly and carrying at one end the ring gear of said fourth planetary assembly and at the other end the ring gear of said fifth planetary assembly, a fourth clutch for releasably clutching together the carriers of said first and third planetary assemblies, a fifth clutch for releasably clutching together said fifth and sixth shafts, a first brake for holding the ring gear of said third planetary assembly stationary relative to said frame, a first output shaft rigidly connected to the carrier of said fourth planetary assembly, and a second output shaft rigidly connected to the carrier of said fifth planetary assembly.

7. The transmission of claim 6 having a hydrostatic steering module having a variable-stroke hydraulic unit and a fixed-stroke hydraulic unit hydraulically connected together so that when one unit serves as a pump the other one serves as a motor and vice versa, its variable-stroke hydraulic unit being connected in driving relation with the variable-stroke hydraulic unit of said driving module, a first gear train connecting the fixed hydraulic unit of said steering module to the sun gear of said fourth planetary assembly, a second gear train connecting the fixed hydraulic unit, through an idler, to the sun gear of said fifth planetary assembly, a second brake for holding the first output shaft stationary relative to said frame, and a third brake for holding the second output shaft stationary relative to said frame.

8. The hydromechanical transmission of claim 6 wherein the sun gear of said second planetary assembly is on said third shaft, and said one gear of said second planetary assembly rigidly connected to said fifth shaft is the ring gear thereof.

9. The hydromechanical transmission of claim 6 wherein the sun gear of said second planetary assembly is said one gear rigidly connected to said fifth shaft and the ring gear of said second planetary assembly is rigidly connected to the carrier of said first planetary assembly.

10. The hydromechanical transmission of claim 6 wherein the carrier of said third planetary assembly carries planet gears having a larger diameter portion in engagement with the sun gear of the third planetary assembly and a smaller diameter portion in engagement with the ring gear of the third planetary assembly.

11. The hydromechanical transmission of claim 6 wherein, in either forward mode or reverse mode, there are four ranges, said third clutch being engaged only in the lowest range, Range I, said first brake being engaged in Ranges I and II, said fourth clutch being engaged in Range III, and said fifth clutch being engaged in Range IV.

12. A hydromechanical transmission, with a hydrostatic starting range, for track-laying vehicles and the like, including in combination:

a main frame, first, second, third, fourth, and fifth planetary assemblies, each having at least one sun gear, one ring gear, and one planet carrier with planet gears, an input shaft having an input bevel gear in engagement with both a forward bevel gear and a reverse bevel gear, said forward bevel gear being mounted on a first shaft, a second shaft coaxial with said first shaft, a first clutch for clutching said second shaft to said forward bevel gear, a second clutch for clutching said second shaft to said reverse bevel gear, a hydrostatic driving module having a variable-stroke hydraulic unit in driving relation with said first shaft, said module also having a fixed-stroke hydraulic unit hydraulically connected to said variable-stroke hydraulic unit, so that when one unit acts as a pump, the other unit acts as a motor, and vice versa, a third shaft in driving relation with said fixed-stroke hydraulic unit and carrying rigidly the sun gear of said first planetary assembly, a fourth shaft coaxial with said third shaft and in driving relation with said second shaft, said fourth shaft being rigidly connected to the ring gear of said first planetary assembly and the carrier of said second planetary assembly, a third clutch for releasably clutching together said third and fourth shafts, a fifth shaft coaxial with said third and fourth shafts and rigidly connected to one gear of said second planetary assembly and to the sun gear of said third planetary assembly, a sixth take-off shaft coaxial with said third, fourth, and fifth shafts and rigidly connected to the carrier of said third planetary assembly and carrying at one end the ring gear of said fourth planetary assembly and at the other end the ring gear of said fifth planetary assembly, a fourth clutch for releasably clutching together the carriers of said first and third planetary assemblies, a fifth clutch for releasably clutching together said fifth and sixth shafts, a first brake for holding the ring gear of said third planetary assembly stationary relative to said frame, a first output shaft rigidly connected to the carrier of said fourth planetary assembly, and a second output shaft rigidly connected to the carrier of said fifth planetary assembly.

13. The transmission of claim 12 having a hydrostatic steering module having a variable-stroke hydraulic unit and a fixed-stroke hydraulic unit hydraulically connected together so that when one unit serves as a pump the other one serves as a motor and vice versa, its variable-stroke hydraulic unit being connected in driving relation with the variable-stroke hydraulic unit of said driving module, a first gear train connecting the fixed hydraulic unit of said steering module to the sun gear of said fourth planetary assembly, a second gear train connecting the fixed hydraulic unit, through an idler, to the sun gear of said fifth planetary assembly, a second brake for holding the first output shaft stationary relative to said frame, and a third brake for holding the second output shaft stationary relative to said frame.

14. The hydromechanical transmission of claim 12 wherein the sun gear of said second planetary assembly is on said third shaft, and said one gear of said second planetary assembly rigidly connected to said fifth shaft is the ring gear thereof.

15. The hydromechanical transmission of claim 12 wherein the sun gear of said second planetary assembly is said one gear rigidly connected to said fifth shaft and the ring gear of said second planetary assembly is rigidly connected to the carrier of said first planetary assembly.

16. The hydromechanical transmission of claim 12 wherein the carrier of said third planetary assembly carries planet gears having a larger diameter portion in engagement with the sun gear of the third planetary assembly and a smaller diameter portion in engagement with the ring gear of the third planetary assembly.

17. The hydromechanical transmission of claim 12 wherein, in either forward mode or reverse mode, there are four ranges, said third clutch being engaged only in the lowest range, Range I, said first brake being engaged in Ranges I and II, said fourth clutch being engaged in Range III, and said fifth clutch being engaged in Range IV.

* * * * *